(12) United States Patent
Lin

(10) Patent No.: US 8,988,809 B1
(45) Date of Patent: Mar. 24, 2015

(54) DISK RECORDING DEVICE FOR WRITING A RADIALLY COHERENT REFERENCE BAND BY MEASURING RELATIVE TIMING OFFSETS OF REFERENCE BURSTS

(71) Applicant: Western Digital (Fremont), LLC, Fremont, CA (US)

(72) Inventor: Enhao Lin, Union City, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 14/183,142

(22) Filed: Feb. 18, 2014

(51) Int. Cl.
*G11B 5/09* (2006.01)
*G11B 5/596* (2006.01)

(52) U.S. Cl.
CPC ................... *G11B 5/59638* (2013.01)
USPC ............................................. 360/52; 360/75

(58) Field of Classification Search
None
See application file for complete search history.

(56) References Cited

U.S. PATENT DOCUMENTS

| | | | |
|---|---|---|---|
| 5,463,600 A * | 10/1995 | Kirino et al. | 369/13.24 |
| 5,570,247 A * | 10/1996 | Brown et al. | 360/75 |
| 5,576,906 A * | 11/1996 | Fisher et al. | 360/77.08 |
| 5,612,833 A * | 3/1997 | Yarmchuk et al. | 360/75 |
| 5,615,058 A * | 3/1997 | Chainer et al. | 360/51 |
| 6,005,738 A | 12/1999 | Chainer et al. | |
| 6,018,789 A | 1/2000 | Sokolov et al. | |
| 6,065,095 A | 5/2000 | Sokolov et al. | |
| 6,078,452 A | 6/2000 | Kittilson et al. | |
| 6,081,447 A | 6/2000 | Lofgren et al. | |
| 6,092,149 A | 7/2000 | Hicken et al. | |
| 6,092,150 A | 7/2000 | Sokolov et al. | |
| 6,094,707 A | 7/2000 | Sokolov et al. | |
| 6,105,104 A | 8/2000 | Guttmann et al. | |
| 6,111,717 A | 8/2000 | Cloke et al. | |
| 6,145,052 A | 11/2000 | Howe et al. | |
| 6,175,893 B1 | 1/2001 | D'Souza et al. | |
| 6,178,056 B1 | 1/2001 | Cloke et al. | |
| 6,191,909 B1 | 2/2001 | Cloke et al. | |
| 6,195,218 B1 | 2/2001 | Guttmann et al. | |
| 6,205,494 B1 | 3/2001 | Williams | |
| 6,208,477 B1 | 3/2001 | Cloke et al. | |
| 6,223,303 B1 | 4/2001 | Billings et al. | |
| 6,230,233 B1 | 5/2001 | Lofgren et al. | |
| 6,246,346 B1 | 6/2001 | Cloke et al. | |

(Continued)

OTHER PUBLICATIONS

Yuhui Tang et al, Characterization of Adjacent Track Erasure in Perpendicular Recording by a Stationary Footprint Technique, IEEE Transactions on Magnetics, vol. 49, No. 2, Feb. 2013, pp. 744-750.*

(Continued)

*Primary Examiner* — Tan X Dinh

(57) ABSTRACT

A disk recording device is disclosed comprising a disk and a head. A first plurality of reference bursts are written along a first radius of the disk, the first plurality of reference bursts comprising a first reference burst. A second plurality of reference bursts are written along a second radius of the disk circumferentially offset from the first radius, the second plurality of reference bursts comprising a second reference burst. A first segment of a reference band is written along a third radius of the disk circumferentially offset from the second radius, and at a first timing offset from the first reference burst. A second timing offset between the first reference burst and the second reference burst is measured, and a second segment of the reference band is written radially coherent with the first segment based on the first timing offset and the second timing offset.

20 Claims, 4 Drawing Sheets

(56) References Cited

U.S. PATENT DOCUMENTS

| | | |
|---|---|---|
| 6,249,393 B1 | 6/2001 | Billings et al. |
| 6,256,695 B1 | 7/2001 | Williams |
| 6,262,857 B1 | 7/2001 | Hull et al. |
| 6,263,459 B1 | 7/2001 | Schibilla |
| 6,272,694 B1 | 8/2001 | Weaver et al. |
| 6,278,568 B1 | 8/2001 | Cloke et al. |
| 6,279,089 B1 | 8/2001 | Schibilla et al. |
| 6,289,484 B1 | 9/2001 | Rothberg et al. |
| 6,292,912 B1 | 9/2001 | Cloke et al. |
| 6,310,740 B1 | 10/2001 | Dunbar et al. |
| 6,317,850 B1 | 11/2001 | Rothberg |
| 6,327,106 B1 | 12/2001 | Rothberg |
| 6,337,778 B1 | 1/2002 | Gagne |
| 6,369,969 B1 | 4/2002 | Christiansen et al. |
| 6,384,999 B1 | 5/2002 | Schibilla |
| 6,388,833 B1 | 5/2002 | Golowka et al. |
| 6,405,342 B1 | 6/2002 | Lee |
| 6,408,357 B1 | 6/2002 | Hanmann et al. |
| 6,408,406 B1 | 6/2002 | Parris |
| 6,411,452 B1 | 6/2002 | Cloke |
| 6,411,458 B1 | 6/2002 | Billings et al. |
| 6,412,083 B1 | 6/2002 | Rothberg et al. |
| 6,415,349 B1 | 7/2002 | Hull et al. |
| 6,425,128 B1 | 7/2002 | Krapf et al. |
| 6,441,981 B1 | 8/2002 | Cloke et al. |
| 6,442,328 B1 | 8/2002 | Elliott et al. |
| 6,445,524 B1 | 9/2002 | Nazarian et al. |
| 6,449,767 B1 | 9/2002 | Krapf et al. |
| 6,453,115 B1 | 9/2002 | Boyle |
| 6,470,420 B1 | 10/2002 | Hospodor |
| 6,480,020 B1 | 11/2002 | Jung et al. |
| 6,480,349 B1 | 11/2002 | Kim et al. |
| 6,480,932 B1 | 11/2002 | Vallis et al. |
| 6,483,986 B1 | 11/2002 | Krapf |
| 6,487,032 B1 | 11/2002 | Cloke et al. |
| 6,490,635 B1 | 12/2002 | Holmes |
| 6,493,173 B1 | 12/2002 | Kim et al. |
| 6,499,083 B1 | 12/2002 | Hamlin |
| 6,519,104 B1 | 2/2003 | Cloke et al. |
| 6,525,892 B1 | 2/2003 | Dunbar et al. |
| 6,545,830 B1 | 4/2003 | Briggs et al. |
| 6,546,489 B1 | 4/2003 | Frank, Jr. et al. |
| 6,550,021 B1 | 4/2003 | Dalphy et al. |
| 6,552,880 B1 | 4/2003 | Dunbar et al. |
| 6,553,457 B1 | 4/2003 | Wilkins et al. |
| 6,578,106 B1 | 6/2003 | Price |
| 6,580,573 B1 | 6/2003 | Hull et al. |
| 6,594,183 B1 | 7/2003 | Lofgren et al. |
| 6,600,620 B1 | 7/2003 | Krounbi et al. |
| 6,601,137 B1 | 7/2003 | Castro et al. |
| 6,603,622 B1 | 8/2003 | Christiansen et al. |
| 6,603,625 B1 | 8/2003 | Hospodor et al. |
| 6,604,220 B1 | 8/2003 | Lee |
| 6,606,682 B1 | 8/2003 | Dang et al. |
| 6,606,714 B1 | 8/2003 | Thelin |
| 6,606,717 B1 | 8/2003 | Yu et al. |
| 6,611,393 B1 | 8/2003 | Nguyen et al. |
| 6,615,312 B1 | 9/2003 | Hamlin et al. |
| 6,639,748 B1 | 10/2003 | Christiansen et al. |
| 6,639,890 B1 * | 10/2003 | Miura et al. ............... 369/116 |
| 6,647,481 B1 | 11/2003 | Luu et al. |
| 6,654,193 B1 | 11/2003 | Thelin |
| 6,657,810 B1 | 12/2003 | Kupferman |
| 6,661,591 B1 | 12/2003 | Rothberg |
| 6,665,772 B1 | 12/2003 | Hamlin |
| 6,687,073 B1 | 2/2004 | Kupferman |
| 6,687,078 B1 | 2/2004 | Kim |
| 6,687,850 B1 | 2/2004 | Rothberg |
| 6,690,523 B1 | 2/2004 | Nguyen et al. |
| 6,690,882 B1 | 2/2004 | Hanmann et al. |
| 6,691,198 B1 | 2/2004 | Hamlin |
| 6,691,213 B1 | 2/2004 | Luu et al. |
| 6,691,255 B1 | 2/2004 | Rothberg et al. |
| 6,693,760 B1 | 2/2004 | Krounbi et al. |
| 6,694,477 B1 | 2/2004 | Lee |
| 6,697,914 B1 | 2/2004 | Hospodor et al. |
| 6,704,153 B1 | 3/2004 | Rothberg et al. |
| 6,708,251 B1 | 3/2004 | Boyle et al. |
| 6,710,951 B1 | 3/2004 | Cloke |
| 6,711,628 B1 | 3/2004 | Thelin |
| 6,711,635 B1 | 3/2004 | Wang |
| 6,711,660 B1 | 3/2004 | Milne et al. |
| 6,715,044 B2 | 3/2004 | Lofgren et al. |
| 6,724,982 B1 | 4/2004 | Hamlin |
| 6,725,329 B1 | 4/2004 | Ng et al. |
| 6,735,650 B1 | 5/2004 | Rothberg |
| 6,735,693 B1 | 5/2004 | Hamlin |
| 6,744,772 B1 | 6/2004 | Eneboe et al. |
| 6,745,283 B1 | 6/2004 | Dang |
| 6,751,402 B1 | 6/2004 | Elliott et al. |
| 6,757,481 B1 | 6/2004 | Nazarian et al. |
| 6,772,281 B2 | 8/2004 | Hamlin |
| 6,781,826 B1 | 8/2004 | Goldstone et al. |
| 6,782,449 B1 | 8/2004 | Codilian et al. |
| 6,791,779 B1 | 9/2004 | Singh et al. |
| 6,792,486 B1 | 9/2004 | Hanan et al. |
| 6,799,274 B1 | 9/2004 | Hamlin |
| 6,811,427 B2 | 11/2004 | Garrett et al. |
| 6,826,003 B1 | 11/2004 | Subrahmanyam |
| 6,826,614 B1 | 11/2004 | Hanmann et al. |
| 6,832,041 B1 | 12/2004 | Boyle |
| 6,832,929 B2 | 12/2004 | Garrett et al. |
| 6,845,405 B1 | 1/2005 | Thelin |
| 6,845,427 B1 | 1/2005 | Atai-Azimi |
| 6,850,443 B2 | 2/2005 | Lofgren et al. |
| 6,851,055 B1 | 2/2005 | Boyle et al. |
| 6,851,063 B1 | 2/2005 | Boyle et al. |
| 6,853,731 B1 | 2/2005 | Boyle et al. |
| 6,854,022 B1 | 2/2005 | Thelin |
| 6,862,660 B1 | 3/2005 | Wilkins et al. |
| 6,880,043 B1 | 4/2005 | Castro et al. |
| 6,882,486 B1 | 4/2005 | Kupferman |
| 6,884,085 B1 | 4/2005 | Goldstone |
| 6,888,831 B1 | 5/2005 | Hospodor et al. |
| 6,892,217 B1 | 5/2005 | Hanmann et al. |
| 6,892,249 B1 | 5/2005 | Codilian et al. |
| 6,892,313 B1 | 5/2005 | Codilian et al. |
| 6,895,455 B1 | 5/2005 | Rothberg |
| 6,895,500 B1 | 5/2005 | Rothberg |
| 6,898,730 B1 | 5/2005 | Hanan |
| 6,910,099 B1 | 6/2005 | Wang et al. |
| 6,928,470 B1 | 8/2005 | Hamlin |
| 6,931,439 B1 | 8/2005 | Hanmann et al. |
| 6,934,104 B1 | 8/2005 | Kupferman |
| 6,934,713 B2 | 8/2005 | Schwartz et al. |
| 6,940,873 B2 | 9/2005 | Boyle et al. |
| 6,943,978 B1 | 9/2005 | Lee |
| 6,948,165 B1 | 9/2005 | Luu et al. |
| 6,950,267 B1 | 9/2005 | Liu et al. |
| 6,954,733 B1 | 10/2005 | Ellis et al. |
| 6,961,814 B1 | 11/2005 | Thelin et al. |
| 6,965,489 B1 | 11/2005 | Lee et al. |
| 6,965,563 B1 | 11/2005 | Hospodor et al. |
| 6,965,966 B1 | 11/2005 | Rothberg et al. |
| 6,967,799 B1 | 11/2005 | Lee |
| 6,968,422 B1 | 11/2005 | Codilian et al. |
| 6,968,450 B1 | 11/2005 | Rothberg et al. |
| 6,973,495 B1 | 12/2005 | Milne et al. |
| 6,973,570 B1 | 12/2005 | Hamlin |
| 6,976,190 B1 | 12/2005 | Goldstone |
| 6,983,316 B1 | 1/2006 | Milne et al. |
| 6,986,007 B1 | 1/2006 | Procyk et al. |
| 6,986,154 B1 | 1/2006 | Price et al. |
| 6,995,933 B1 | 2/2006 | Codilian et al. |
| 6,996,501 B1 | 2/2006 | Rothberg |
| 6,996,669 B1 | 2/2006 | Dang et al. |
| 7,002,926 B1 | 2/2006 | Eneboe et al. |
| 7,003,674 B1 | 2/2006 | Hamlin |
| 7,006,316 B1 | 2/2006 | Sargenti, Jr. et al. |
| 7,009,820 B1 | 3/2006 | Hogg |
| 7,023,639 B1 | 4/2006 | Kupferman |
| 7,024,491 B1 | 4/2006 | Hanmann et al. |
| 7,024,549 B1 | 4/2006 | Luu et al. |
| 7,024,614 B1 | 4/2006 | Thelin et al. |

(56) References Cited

U.S. PATENT DOCUMENTS

| | | | |
|---|---|---|---|
| 7,027,716 | B1 | 4/2006 | Boyle et al. |
| 7,028,174 | B1 | 4/2006 | Atai-Azimi et al. |
| 7,031,902 | B1 | 4/2006 | Catiller |
| 7,046,465 | B1 | 5/2006 | Kupferman |
| 7,046,488 | B1 | 5/2006 | Hogg |
| 7,050,252 | B1 | 5/2006 | Vallis |
| 7,054,937 | B1 | 5/2006 | Milne et al. |
| 7,055,000 | B1 | 5/2006 | Severtson |
| 7,055,167 | B1 | 5/2006 | Masters |
| 7,057,836 | B1 | 6/2006 | Kupferman |
| 7,062,398 | B1 | 6/2006 | Rothberg |
| 7,075,746 | B1 | 7/2006 | Kupferman |
| 7,076,604 | B1 | 7/2006 | Thelin |
| 7,082,494 | B1 | 7/2006 | Thelin et al. |
| 7,085,084 | B2 * | 8/2006 | Yasuna et al. .................. 360/51 |
| 7,088,538 | B1 | 8/2006 | Codilian et al. |
| 7,088,545 | B1 | 8/2006 | Singh et al. |
| 7,092,186 | B1 | 8/2006 | Hogg |
| 7,095,577 | B1 | 8/2006 | Codilian et al. |
| 7,099,095 | B1 | 8/2006 | Subrahmanyam et al. |
| 7,106,537 | B1 | 9/2006 | Bennett |
| 7,106,947 | B2 | 9/2006 | Boyle et al. |
| 7,110,202 | B1 | 9/2006 | Vasquez |
| 7,111,116 | B1 | 9/2006 | Boyle et al. |
| 7,114,029 | B1 | 9/2006 | Thelin |
| 7,120,737 | B1 | 10/2006 | Thelin |
| 7,120,806 | B1 | 10/2006 | Codilian et al. |
| 7,126,776 | B1 | 10/2006 | Warren, Jr. et al. |
| 7,129,763 | B1 | 10/2006 | Bennett et al. |
| 7,133,600 | B1 | 11/2006 | Boyle |
| 7,136,244 | B1 | 11/2006 | Rothberg |
| 7,146,094 | B1 | 12/2006 | Boyle |
| 7,149,046 | B1 | 12/2006 | Coker et al. |
| 7,150,036 | B1 | 12/2006 | Milne et al. |
| 7,155,616 | B1 | 12/2006 | Hamlin |
| 7,171,108 | B1 | 1/2007 | Masters et al. |
| 7,171,110 | B1 | 1/2007 | Wilshire |
| 7,194,576 | B1 | 3/2007 | Boyle |
| 7,200,698 | B1 | 4/2007 | Rothberg |
| 7,205,805 | B1 | 4/2007 | Bennett |
| 7,206,497 | B1 | 4/2007 | Boyle et al. |
| 7,215,496 | B1 | 5/2007 | Kupferman et al. |
| 7,215,771 | B1 | 5/2007 | Hamlin |
| 7,237,054 | B1 | 6/2007 | Cain et al. |
| 7,240,161 | B1 | 7/2007 | Boyle |
| 7,249,365 | B1 | 7/2007 | Price et al. |
| 7,263,709 | B1 | 8/2007 | Krapf |
| 7,274,639 | B1 | 9/2007 | Codilian et al. |
| 7,274,659 | B2 | 9/2007 | Hospodor |
| 7,275,116 | B1 | 9/2007 | Hanmann et al. |
| 7,280,302 | B1 | 10/2007 | Masiewicz |
| 7,292,774 | B1 | 11/2007 | Masters et al. |
| 7,292,775 | B1 | 11/2007 | Boyle et al. |
| 7,296,284 | B1 | 11/2007 | Price et al. |
| 7,302,501 | B1 | 11/2007 | Cain et al. |
| 7,302,579 | B1 | 11/2007 | Cain et al. |
| 7,318,088 | B1 | 1/2008 | Mann |
| 7,319,806 | B1 | 1/2008 | Willner et al. |
| 7,325,244 | B2 | 1/2008 | Boyle et al. |
| 7,330,323 | B1 | 2/2008 | Singh et al. |
| 7,346,790 | B1 | 3/2008 | Klein |
| 7,366,641 | B1 | 4/2008 | Masiewicz et al. |
| 7,369,340 | B1 | 5/2008 | Dang et al. |
| 7,369,343 | B1 | 5/2008 | Yeo et al. |
| 7,372,650 | B1 | 5/2008 | Kupferman |
| 7,380,147 | B1 | 5/2008 | Sun |
| 7,392,340 | B1 | 6/2008 | Dang et al. |
| 7,404,013 | B1 | 7/2008 | Masiewicz |
| 7,406,545 | B1 | 7/2008 | Rothberg et al. |
| 7,415,571 | B1 | 8/2008 | Hanan |
| 7,436,610 | B1 | 10/2008 | Thelin |
| 7,437,502 | B1 | 10/2008 | Coker |
| 7,440,214 | B1 | 10/2008 | Ell et al. |
| 7,451,344 | B1 | 11/2008 | Rothberg |
| 7,471,483 | B1 | 12/2008 | Ferris et al. |
| 7,471,486 | B1 | 12/2008 | Coker et al. |
| 7,486,060 | B1 | 2/2009 | Bennett |
| 7,496,493 | B1 | 2/2009 | Stevens |
| 7,518,819 | B1 | 4/2009 | Yu et al. |
| 7,526,184 | B1 | 4/2009 | Parkinen et al. |
| 7,539,924 | B1 | 5/2009 | Vasquez et al. |
| 7,543,117 | B1 | 6/2009 | Hanan |
| 7,551,383 | B1 | 6/2009 | Kupferman |
| 7,562,282 | B1 | 7/2009 | Rothberg |
| 7,577,973 | B1 | 8/2009 | Kapner, III et al. |
| 7,596,797 | B1 | 9/2009 | Kapner, III et al. |
| 7,599,139 | B1 | 10/2009 | Bombet et al. |
| 7,602,575 | B1 * | 10/2009 | Lifchits et al. .................. 360/75 |
| 7,619,841 | B1 | 11/2009 | Kupferman |
| 7,647,544 | B1 | 1/2010 | Masiewicz |
| 7,649,704 | B1 | 1/2010 | Bombet et al. |
| 7,653,927 | B1 | 1/2010 | Kapner, III et al. |
| 7,656,603 | B1 | 2/2010 | Xing |
| 7,656,763 | B1 | 2/2010 | Jin et al. |
| 7,657,149 | B2 | 2/2010 | Boyle |
| 7,672,072 | B1 | 3/2010 | Boyle et al. |
| 7,673,075 | B1 | 3/2010 | Masiewicz |
| 7,688,540 | B1 | 3/2010 | Mei et al. |
| 7,724,461 | B1 | 5/2010 | McFadyen et al. |
| 7,725,584 | B1 | 5/2010 | Hanmann et al. |
| 7,730,295 | B1 | 6/2010 | Lee |
| 7,760,458 | B1 | 7/2010 | Trinh |
| 7,768,776 | B1 | 8/2010 | Szeremeta et al. |
| 7,787,208 | B2 * | 8/2010 | Min et al. .................. 360/77.02 |
| 7,804,657 | B1 | 9/2010 | Hogg et al. |
| 7,813,954 | B1 | 10/2010 | Price et al. |
| 7,827,320 | B1 | 11/2010 | Stevens |
| 7,839,588 | B1 | 11/2010 | Dang et al. |
| 7,843,660 | B1 | 11/2010 | Yeo |
| 7,852,596 | B2 | 12/2010 | Boyle et al. |
| 7,859,782 | B1 | 12/2010 | Lee |
| 7,872,822 | B1 | 1/2011 | Rothberg |
| 7,898,756 | B1 | 3/2011 | Wang |
| 7,898,762 | B1 | 3/2011 | Guo et al. |
| 7,900,037 | B1 | 3/2011 | Fallone et al. |
| 7,907,364 | B2 | 3/2011 | Boyle et al. |
| 7,929,234 | B1 | 4/2011 | Boyle et al. |
| 7,933,087 | B1 | 4/2011 | Tsai et al. |
| 7,933,090 | B1 | 4/2011 | Jung et al. |
| 7,934,030 | B1 | 4/2011 | Sargenti, Jr. et al. |
| 7,940,491 | B2 | 5/2011 | Szeremeta et al. |
| 7,944,639 | B1 | 5/2011 | Wang |
| 7,945,727 | B2 | 5/2011 | Rothberg et al. |
| 7,949,564 | B1 | 5/2011 | Hughes et al. |
| 7,974,029 | B2 | 7/2011 | Tsai et al. |
| 7,974,039 | B1 | 7/2011 | Xu et al. |
| 7,982,993 | B1 | 7/2011 | Tsai et al. |
| 7,984,200 | B1 | 7/2011 | Bombet et al. |
| 7,990,648 | B1 | 8/2011 | Wang |
| 7,992,179 | B1 | 8/2011 | Kapner, III et al. |
| 8,004,785 | B1 | 8/2011 | Tsai et al. |
| 8,006,027 | B1 | 8/2011 | Stevens et al. |
| 8,014,094 | B1 | 9/2011 | Jin |
| 8,014,977 | B1 | 9/2011 | Masiewicz et al. |
| 8,019,914 | B1 | 9/2011 | Vasquez et al. |
| 8,040,625 | B1 | 10/2011 | Boyle et al. |
| 8,078,943 | B1 | 12/2011 | Lee |
| 8,079,045 | B2 | 12/2011 | Krapf et al. |
| 8,082,433 | B1 | 12/2011 | Fallone et al. |
| 8,085,487 | B1 | 12/2011 | Jung et al. |
| 8,089,719 | B1 | 1/2012 | Dakroub |
| 8,090,902 | B1 | 1/2012 | Bennett et al. |
| 8,090,906 | B1 | 1/2012 | Blaha et al. |
| 8,091,112 | B1 | 1/2012 | Elliott et al. |
| 8,094,396 | B1 | 1/2012 | Zhang et al. |
| 8,094,401 | B1 | 1/2012 | Peng et al. |
| 8,116,020 | B1 | 2/2012 | Lee |
| 8,116,025 | B1 | 2/2012 | Chan et al. |
| 8,134,793 | B1 | 3/2012 | Vasquez et al. |
| 8,134,798 | B1 | 3/2012 | Thelin et al. |
| 8,139,301 | B1 | 3/2012 | Li et al. |
| 8,139,310 | B1 | 3/2012 | Hogg |
| 8,144,419 | B1 | 3/2012 | Liu |
| 8,145,452 | B1 | 3/2012 | Masiewicz et al. |

(56) References Cited

U.S. PATENT DOCUMENTS

| | | |
|---|---|---|
| 8,149,528 B1 | 4/2012 | Suratman et al. |
| 8,154,812 B1 | 4/2012 | Boyle et al. |
| 8,159,768 B1 | 4/2012 | Miyamura |
| 8,161,328 B1 | 4/2012 | Wilshire |
| 8,164,849 B1 | 4/2012 | Szeremeta et al. |
| 8,174,780 B1 | 5/2012 | Tsai et al. |
| 8,190,575 B1 | 5/2012 | Ong et al. |
| 8,194,338 B1 | 6/2012 | Zhang |
| 8,194,340 B1 | 6/2012 | Boyle et al. |
| 8,194,341 B1 | 6/2012 | Boyle |
| 8,201,066 B1 | 6/2012 | Wang |
| 8,271,692 B1 | 9/2012 | Dinh et al. |
| 8,279,550 B1 | 10/2012 | Hogg |
| 8,281,218 B1 | 10/2012 | Ybarra et al. |
| 8,285,923 B2 | 10/2012 | Stevens |
| 8,289,656 B1 | 10/2012 | Huber |
| 8,305,705 B1 | 11/2012 | Roohr |
| 8,307,156 B1 | 11/2012 | Codilian et al. |
| 8,310,775 B1 | 11/2012 | Boguslawski et al. |
| 8,315,006 B1 | 11/2012 | Chahwan et al. |
| 8,316,263 B1 | 11/2012 | Gough et al. |
| 8,320,067 B1 | 11/2012 | Tsai et al. |
| 8,324,974 B1 | 12/2012 | Bennett |
| 8,332,695 B2 | 12/2012 | Dalphy et al. |
| 8,339,919 B1 | 12/2012 | Lee |
| 8,341,337 B1 | 12/2012 | Ong et al. |
| 8,350,628 B1 | 1/2013 | Bennett |
| 8,356,184 B1 | 1/2013 | Meyer et al. |
| 8,370,683 B1 | 2/2013 | Ryan et al. |
| 8,375,225 B1 | 2/2013 | Ybarra |
| 8,375,274 B1 | 2/2013 | Bonke |
| 8,380,922 B1 | 2/2013 | DeForest et al. |
| 8,390,948 B2 | 3/2013 | Hogg |
| 8,390,952 B1 | 3/2013 | Szeremeta |
| 8,392,689 B1 | 3/2013 | Lott |
| 8,407,393 B1 | 3/2013 | Yolar et al. |
| 8,413,010 B1 | 4/2013 | Vasquez et al. |
| 8,417,566 B2 | 4/2013 | Price et al. |
| 8,421,663 B1 | 4/2013 | Bennett |
| 8,422,172 B1 | 4/2013 | Dakroub et al. |
| 8,427,770 B1 | 4/2013 | O'Dell et al. |
| 8,427,771 B1 | 4/2013 | Tsai |
| 8,429,343 B1 | 4/2013 | Tsai |
| 8,433,937 B1 | 4/2013 | Wheelock et al. |
| 8,433,977 B1 | 4/2013 | Vasquez et al. |
| 8,441,909 B1 | 5/2013 | Thayamballi et al. |
| 8,456,980 B1 | 6/2013 | Thayamballi |
| 8,458,526 B2 | 6/2013 | Dalphy et al. |
| 8,462,466 B2 | 6/2013 | Huber |
| 8,467,151 B1 | 6/2013 | Huber |
| 8,483,027 B1 | 7/2013 | Mak et al. |
| 8,489,841 B1 | 7/2013 | Strecke et al. |
| 8,493,679 B1 | 7/2013 | Boguslawski et al. |
| 8,499,198 B1 | 7/2013 | Messenger et al. |
| 8,514,506 B1 | 8/2013 | Li et al. |
| 8,554,741 B1 | 10/2013 | Malina |
| 8,560,759 B1 | 10/2013 | Boyle et al. |
| 8,576,509 B1 | 11/2013 | Hogg |
| 8,576,511 B1 | 11/2013 | Coker et al. |
| 8,578,100 B1 | 11/2013 | Huynh et al. |
| 8,578,242 B1 | 11/2013 | Burton et al. |
| 8,582,223 B1 | 11/2013 | Garani et al. |
| 8,582,231 B1 | 11/2013 | Kermiche et al. |
| 8,589,773 B1 | 11/2013 | Wang et al. |
| 8,593,753 B1 | 11/2013 | Anderson |
| 8,599,512 B2 | 12/2013 | Hogg |
| 8,605,379 B1 | 12/2013 | Sun |
| 8,611,031 B1 | 12/2013 | Tan et al. |
| 8,611,032 B2 | 12/2013 | Champion et al. |
| 8,612,798 B1 | 12/2013 | Tsai |
| 8,619,383 B1 | 12/2013 | Jung et al. |
| 8,619,508 B1 | 12/2013 | Krichevsky et al. |
| 8,619,529 B1 | 12/2013 | Liew et al. |
| 8,621,115 B1 | 12/2013 | Bombet et al. |
| 8,621,133 B1 | 12/2013 | Boyle |
| 8,625,224 B1 | 1/2014 | Lin et al. |
| 8,625,225 B1 | 1/2014 | Wang |
| 8,626,463 B2 | 1/2014 | Stevens et al. |
| 8,630,052 B1 | 1/2014 | Jung et al. |
| 8,631,188 B1 | 1/2014 | Heath et al. |
| 8,635,412 B1 | 1/2014 | Wilshire |
| 8,661,193 B1 | 2/2014 | Cobos et al. |
| 8,665,547 B1 | 3/2014 | Yeo et al. |
| 8,667,248 B1 | 3/2014 | Neppalli |
| 8,670,205 B1 | 3/2014 | Malina et al. |
| 8,671,250 B2 | 3/2014 | Lee |
| 8,681,442 B2 | 3/2014 | Hogg |
| 8,681,445 B1 | 3/2014 | Kermiche et al. |
| 8,683,295 B1 | 3/2014 | Syu et al. |
| 8,687,306 B1 | 4/2014 | Coker et al. |
| 8,687,307 B1 | 4/2014 | Patton, III |
| 8,687,313 B2 | 4/2014 | Selvaraj |
| 8,693,133 B1 | 4/2014 | Lee et al. |
| 8,698,492 B1 | 4/2014 | Mak et al. |
| 8,699,171 B1 | 4/2014 | Boyle |
| 8,699,172 B1 | 4/2014 | Gunderson et al. |
| 8,711,500 B1 | 4/2014 | Fong et al. |
| 8,711,506 B1 | 4/2014 | Giovenzana et al. |
| 8,711,665 B1 | 4/2014 | Hamid |
| 8,717,694 B1 | 5/2014 | Liew et al. |
| 8,717,695 B1 | 5/2014 | Lin et al. |
| 8,730,612 B1 | 5/2014 | Haralson |
| 8,743,502 B1 | 6/2014 | Bonke et al. |
| 8,749,911 B1 | 6/2014 | Sun et al. |
| 2009/0113702 A1 | 5/2009 | Hogg |
| 2010/0306551 A1 | 12/2010 | Meyer et al. |
| 2011/0181977 A1* | 7/2011 | Kim et al. ............ 360/48 |
| 2011/0226729 A1 | 9/2011 | Hogg |
| 2012/0159042 A1 | 6/2012 | Lott et al. |
| 2012/0275050 A1 | 11/2012 | Wilson et al. |
| 2012/0281963 A1 | 11/2012 | Krapf et al. |
| 2012/0324980 A1 | 12/2012 | Nguyen et al. |

OTHER PUBLICATIONS

Shaoping et al, Side-track Erasure processes in perpendicular Recording, IEEE Transaction on Magnetics, vol. 42 No. 12, Dec. 2006, pp. 3874-3879.*

Yuhui Tang, et al., "Characterization of Adjacent Track Erasure in Perpendicular Recording by a Stationary Footprint Technique," IEEE Transactions on Magnetics, vol. 49, No. 2, Feb. 2013; pp. 744-750.

Shaoping Li, et al., "Side-Track Erasure Processes in Perpendicular Recording," IEEE Transactions on Magnetics, vol. 42, No. 12, Dec. 2006; pp. 3874-3879.

* cited by examiner

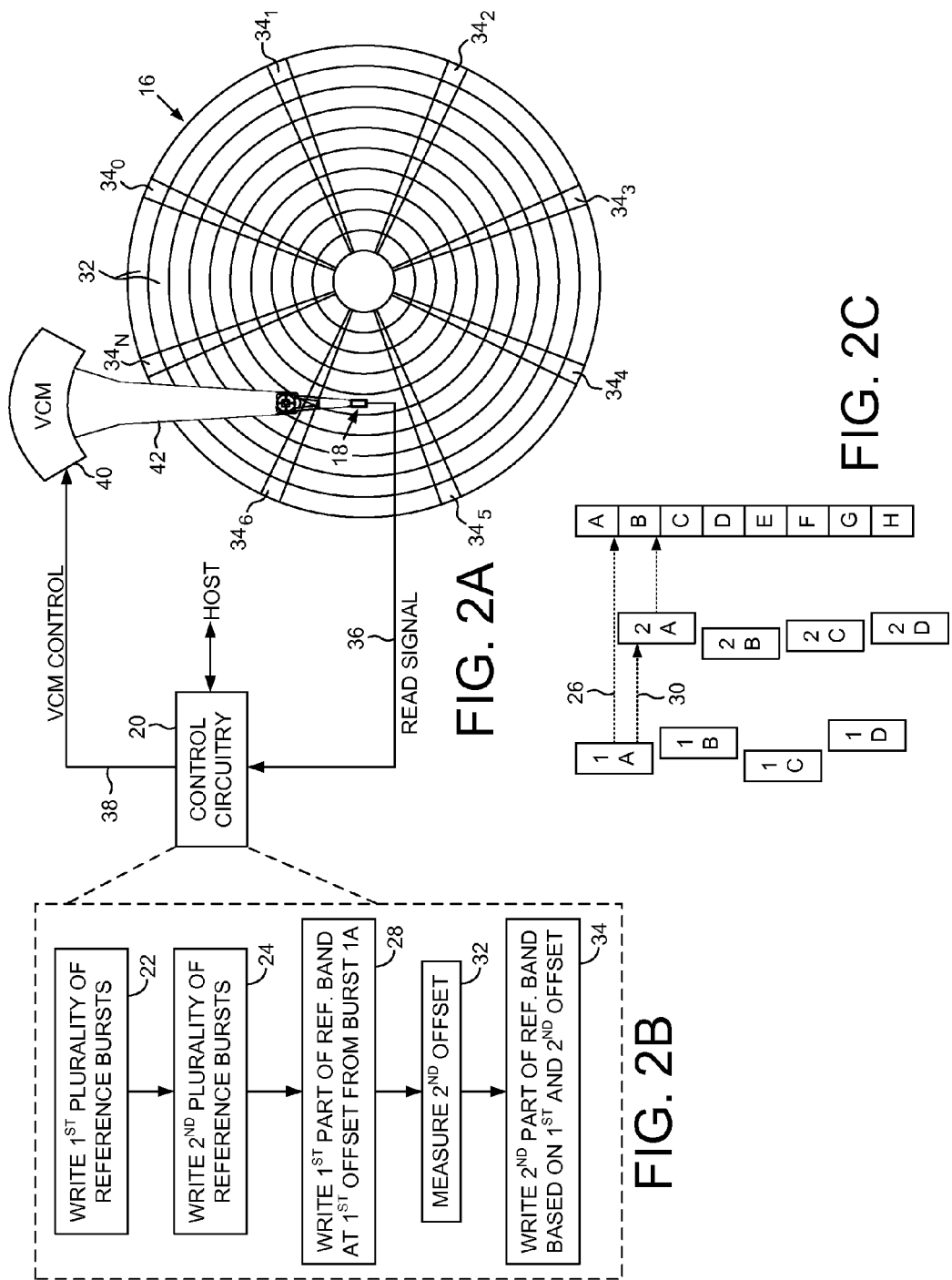

DISK RECORDING DEVICE FOR WRITING A RADIALLY COHERENT REFERENCE BAND BY MEASURING RELATIVE TIMING OFFSETS OF REFERENCE BURSTS

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations.

It may be desirable to write a radial coherent reference band on the disk, for example, to enable synchronized writing and/or reading of data. For example, the radial coherent reference band may be read synchronously using a read-back clock that is also used to read a test pattern, wherein the resulting read signal may be evaluated to measure the quality of magnetic transitions recorded on the disk for a particular head/media combination.

BRIEF DESCRIPTION OF THE DRAWINGS

FIG. 2A shows a disk recording device according to an embodiment comprising a disk and a head.

FIG. 2B is a flow diagram according to an embodiment wherein a first and second plurality of reference bursts are processed to write a radially coherent reference band.

FIG. 2C shows an embodiment wherein the disk comprises a first plurality of reference bursts and a second plurality of reference bursts circumferentially offset from the first plurality which are processed to write the radially coherent reference band.

DETAILED DESCRIPTION

Figure 1:
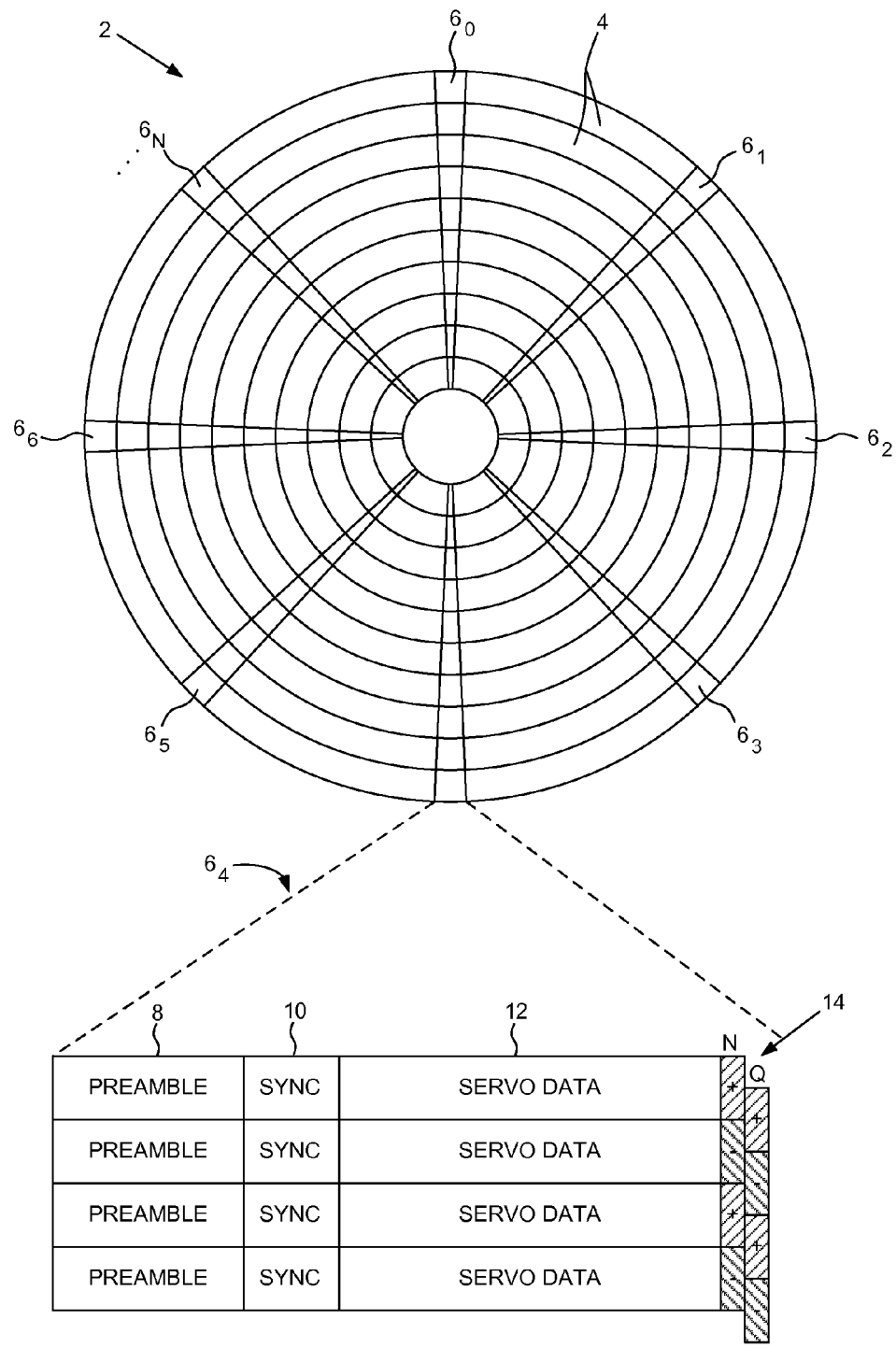
FIG. 1 shows a prior art disk format comprising a plurality of servo tracks defined by servo sectors.

FIG. 2A shows a disk recording device according to an embodiment comprising a disk 16, a head 18, and control circuitry 20 configured to execute the flow diagram of FIG. 2B wherein a first plurality of reference bursts are written along a first radius of the disk (block 22), wherein the first plurality of reference bursts comprise a first reference burst (e.g., burst 1A in FIG. 2C). A second plurality of reference bursts are written along a second radius of the disk circumferentially offset from the first radius (block 24), wherein the second plurality of reference bursts comprise a second reference burst (e.g., burst 2A in FIG. 2C). A first segment of a reference band (e.g., segment A in FIG. 2C) is written at a third radius of the disk circumferentially offset from the second radius, and at a first timing offset 26 (FIG. 2C) from the first reference burst (block 28). A second timing offset 30 is measured between the first reference burst and the second reference burst (block 32), and a second segment of the reference band (e.g., segment B in FIG. 2C) is written radially coherent with the first segment based on the first timing offset 26 and the second timing offset 30 (block 34).

In the embodiment of FIG. 2A, a plurality of concentric servo tracks 32 are defined by servo sectors $34_0$-$34_N$. The control circuitry 20 processes a read signal 36 emanating from the head 18 to demodulate the servo sectors and generate a position error signal (PES) representing an error between the actual position of the head and a target position relative to a target track. The control circuitry 20 filters the PES using a suitable compensation filter to generate a control signal 38 applied to a voice coil motor (VCM) 40 which rotates an actuator arm 42 about a pivot in order to actuate the head 18 radially over the disk 16 in a direction that reduces the PES. The servo sectors $34_0$-$34_N$ may comprise any suitable head position information, such as a track address for coarse positioning and servo bursts for fine positioning. The servo bursts may comprise any suitable pattern, such as an amplitude based servo pattern or a phase based servo pattern (e.g., FIG. 1).

In one embodiment, the disk recording device shown in FIG. 2A may comprise a disk drive which may write the radially coherent reference band to the disk 16 (e.g., as shown in FIG. 2C) during a manufacturing procedure in order to qualify and or calibrate various components of the disk drive, such as a write element, a read element, and/or components in a preamp and/or a write/read channel. In another embodiment, the disk recording device shown in FIG. 2A may comprise a spin stand used during the design and development of a disk drive. In one embodiment, the spin stand may comprise a push-pin that is inserted through an aperture of a head disk assembly (HDA) and used to actuate the head 18 over the disk 16 in fine radial movements by rotating the actuator arm 42 about a pivot (e.g., while the VCM 40 biases the actuator arm 42 against the push-pin). In one embodiment, the spin stand may process the servo sectors $34_0$-$34_N$ on the disk in order to position the head at a desired radial location as described above, and in another embodiment the spin stand may employ a different position measuring system, such as a laser interferometer. In one embodiment, the spin stand may process the radially coherent reference band such as shown in FIG. 2C in order to measure the quality of magnetic transitions recorded on the disk for a particular head/media combination.

In the embodiment of FIG. 2C, the second plurality of reference bursts (2A, 2B, 2C, . . . ) are written at a radial offset from the first plurality of reference bursts (1A, 1B, 1C, . . . ) by less than a width of a reference burst. In the example of FIG. 2C, the radial offset equals approximately half of a reference burst so that, for example, reference burst 2A spans half of reference burst 1A and half of reference burst 1B. In one embodiment the reference bursts are written at approximately the same circumferential location, but due to an arbitrary timing error, the first plurality of reference bursts (1A, 1B, 1C, . . . ) are not written radially coherent and the second plurality of reference bursts (2A, 2B, 2C, . . . ) are not written radially coherent as shown in FIG. 2C. In one embodiment, the relative circumferential offsets of the reference bursts are measured in order to write each segment of the reference band (A, B, C, . . . ) at substantially the same circumferential location so that the reference band is radially coherent as shown in FIG. 2C.

Figure 3A:
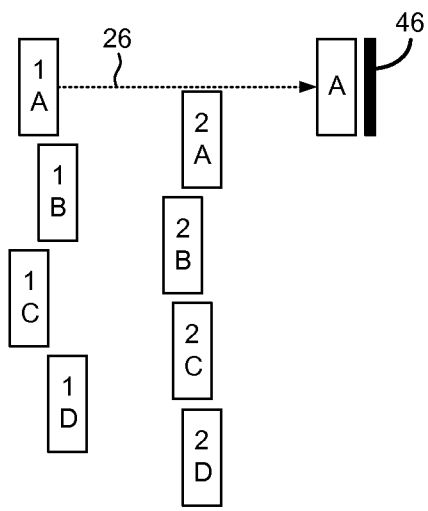
FIGS. 3A-3C illustrate an embodiment where the radially coherent reference band is written in segments while measuring timing offsets between the reference bursts.
Figure 3B:
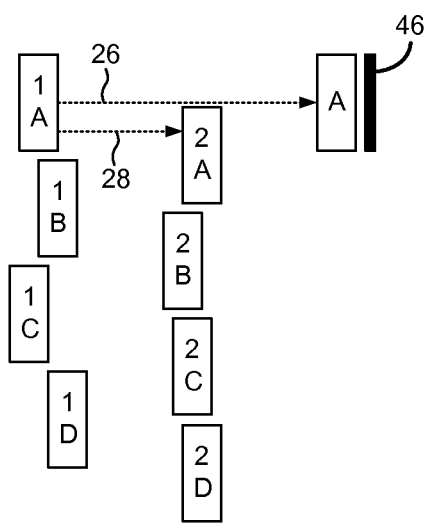
Figure 3C:
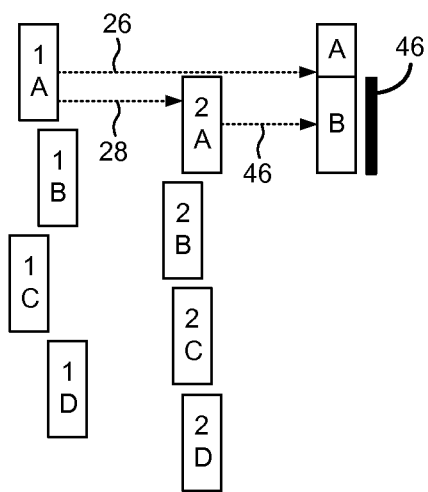

FIGS. 3A-3C illustrate an embodiment for writing the radial coherent reference band using two sets of reference bursts as shown in FIG. 2C. During a first revolution of the disk as illustrated in FIG. 3A, a write element 44 of the head 18 is positioned at a radial location corresponding to the middle of a first reference burst 1A. After the read element of the head (not shown) passes over the first reference burst 1A, the first segment A of the reference band is written at a first timing offset 26 from the first reference burst 1A. For example, in one embodiment a disk locked clock synchronized to a rotation of the disk is used to time an interval from when the read element passes over the first reference burst 1A until the first segment A of the reference band is written. During a second revolution of the disk as illustrated in FIG. 3B, the read element is positioned at a radial location corresponding to approximately one-quarter offset from the center of the first reference burst 1A and a second timing offset 28 is measured (e.g., using the disk locked clock) from when the read element passes over the first reference burst 1A until the read element passes over the second reference burst 2A. During a third revolution of the disk as illustrated in FIG. 3C, the write element 44 is positioned at a radial location corresponding to the middle of the second reference burst 2A. A third timing offset 46 is computed as the difference between the first timing offset 26 and the second timing offset 28. When the read element passes over the second reference burst 2A, the second segment B of the reference band is written after the third timing offset 46, thereby writing the second segment B radially coherent with the first segment A. A similar technique is then used to write the remaining segments of the reference band. For example, segment C of the reference band is written from a timing offset relative to reference burst 1B computed as the sum of the timing offset measured from 1B→2A plus the timing offset 46 from 2A→B.

Figure 4A:
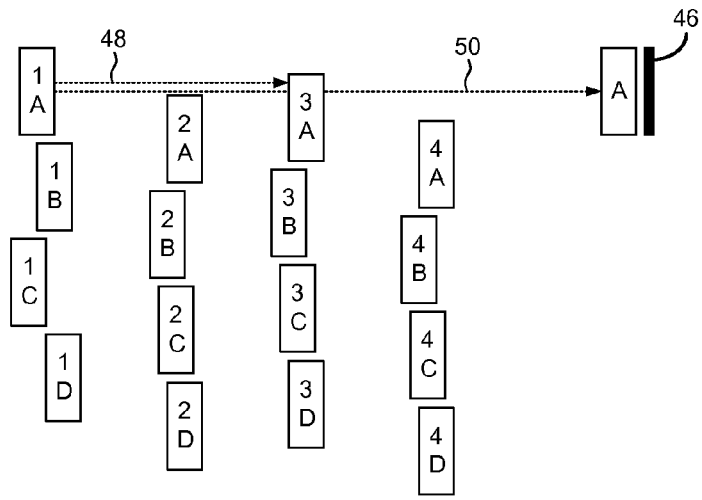
FIGS. 4A-4C illustrate an embodiment wherein a third and fourth plurality of reference bursts are used to write the radially coherent reference band.
Figure 4B:
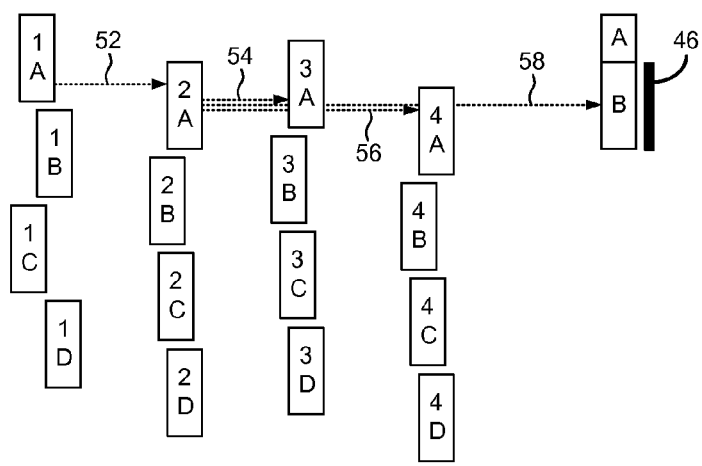
Figure 4C:
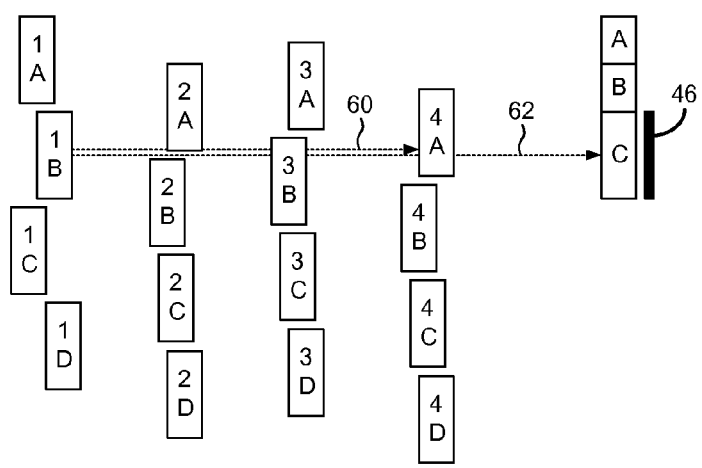

FIGS. 4A-4C illustrate an embodiment wherein four sets of reference bursts are written along circumferentially offset radiuses and radially offset from one another by one-quarter of a reference burst. During a first revolution of the disk, the write element 44 is positioned at a radial location corresponding to a center of the first reference burst 1A, a timing offset 48 for 1A→3A is measured, and then the first segment A of the reference band is written after a timing offset 50. During a second revolution of the disk as illustrated in FIG. 4B, the write element 44 is positioned at a radial location corresponding to the center of reference burst 2A, a timing offset 54 for 2A→3A is measured, a timing offset 52 for 1A→2A is computed based on the measured timing offset 48 (1A→2A=1A→3A−2A→3A), a timing offset 56 for 2A→4A is measured, and the second segment B of the reference band is written after a timing offset 58 corresponding to 2A→B and computed as the timing offset 50 (1A→A) minus the timing offset 52 (1A→2A). During a third revolution of the disk as illustrated in FIG. 4C, the write element 44 is positioned at a radial location corresponding to a center of reference burst 1B, a timing offset 60 for 1B→4A is measured, and the third segment C of the reference band is written after a timing offset 62 corresponding to 1B→C and computed as:

$$1B \rightarrow C = 2A \rightarrow B + 1B \rightarrow 2A = 2A \rightarrow B + (1B \rightarrow 4A - 2A \rightarrow 4A).$$

A similar technique is then used to write the remaining segments of the reference band. For example, segment D of the reference band is written after a timing offset corresponding to 2B→D computed as:

$$2B \rightarrow D = 1B \rightarrow C - 1B \rightarrow 2B$$

and so on. Accordingly, the timing offsets measured between the reference bursts are used to synchronize the timing when writing the segments of the reference band such that the segments of the reference band are written radially coherent. This is true even though the reference bursts are themselves not written radially coherent as illustrated in the figures.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A disk recording device comprising:
    a disk;
    a head; and
    control circuitry configured to:
        write a first plurality of reference bursts along a first radius of the disk, the first plurality of reference bursts comprising a first reference burst;
        write a second plurality of reference bursts along a second radius of the disk circumferentially offset from the first radius, the second plurality of reference bursts comprising a second reference burst;
        write a first segment of a reference band along a third radius of the disk circumferentially offset from the second radius, and at a first timing offset from the first reference burst;
        measure a second timing offset between the first reference burst and the second reference burst; and
        write a second segment of the reference band radially coherent with the first segment based on the first timing offset and the second timing offset.

2. The disk recording device as recited in claim 1, wherein the first plurality of reference bursts are not radially coherent and the second plurality of reference bursts are not radially coherent.

3. The disk recording device as recited in claim 1, wherein the second reference burst is radially offset from the first reference burst by less than a width of the first reference burst.

4. The disk recording device as recited in claim 1, further comprising a write element, wherein a width of the first reference burst and a width of the second reference burst correspond to a width of the write element.

5. The disk recording device as recited in claim 1, wherein the control circuitry is further operable to:
    write the first segment of the reference band during a first revolution of the disk;
    measure the second timing offset during a second revolution of the disk; and
    write the second segment of the reference band during a third revolution of the disk.

6. The disk recording device as recited in claim 1, wherein the control circuitry is further operable to:
    write a third plurality of reference bursts along a fourth radius of the disk circumferentially offset from the first and second radius, the third plurality of reference bursts comprising a third reference burst;
    measure a third timing offset between the second reference burst and the third reference burst; and
    write the second segment of the reference band radially coherent with the first segment based on the first timing offset, the second timing offset, and the third timing offset.

7. The disk recording device as recited in claim 6, wherein the control circuitry is further operable to:
    write the first segment of the reference band during a first revolution of the disk;
    measure the second timing offset during the first revolution of the disk;
    write the second segment of the reference band during a second revolution of the disk; and
    measure the third timing offset during the second revolution of the disk.

8. The disk recording device as recited in claim 6, wherein the control circuitry is further operable to:
    write a fourth plurality of reference bursts along a fifth radius of the disk circumferentially offset from the first, second and fourth radius, the fourth plurality of reference bursts comprising a fourth reference burst;
    measure a fourth timing offset between the third reference burst and the fourth reference burst; and
    write a third segment of the reference band radially coherent with the second segment based on the fourth timing offset.

9. The disk recording device as recited in claim 8, wherein the control circuitry is further operable to:
    write the first segment of the reference band during a first revolution of the disk;
    write the second segment of the reference band during a second revolution of the disk;
    measure the fourth timing offset during the second revolution of the disk; and
    write the third segment of the reference band during a third revolution of the disk.

10. The disk recording device as recited in claim 8, wherein the control circuitry is further operable to measure the second offset by measuring an interval as the disk rotates.

11. A method of operating disk recording device, the method comprising:
    writing a first plurality of reference bursts along a first radius of the disk, the first plurality of reference bursts comprising a first reference burst;
    writing a second plurality of reference bursts along a second radius of the disk circumferentially offset from the first radius, the second plurality of reference bursts comprising a second reference burst;
    writing a first segment of a reference band along a third radius of the disk circumferentially offset from the second radius, and at a first timing offset from the first reference burst;
    measuring a second timing offset between the first reference burst and the second reference burst; and
    writing a second segment of the reference band radially coherent with the first segment based on the first timing offset and the second timing offset.

12. The method as recited in claim 11, wherein the first plurality of reference bursts are not radially coherent and the second plurality of reference bursts are not radially coherent.

13. The method as recited in claim 11, wherein the second reference burst is radially offset from the first reference burst by less than a width of the first reference burst.

14. The method as recited in claim 11, wherein a width of the first reference burst and a width of the second reference burst correspond to a width of the write element used to write the first reference burst and the second reference burst.

15. The method as recited in claim 11, further comprising:
    writing the first segment of the reference band during a first revolution of the disk;
    measuring the second timing offset during a second revolution of the disk; and
    writing the second segment of the reference band during a third revolution of the disk.

16. The method as recited in claim 11, further comprising:
    writing a third plurality of reference bursts along a fourth radius of the disk circumferentially offset from the first and second radius, the third plurality of reference bursts comprising a third reference burst;
    measuring a third timing offset between the second reference burst and the third reference burst; and writing the second segment of the reference band radially coherent with the first segment based on the first timing offset, the second timing offset, and the third timing offset.

17. The method as recited in claim 16, further comprising:

writing the first segment of the reference band during a first revolution of the disk;

measuring the second timing offset during the first revolution of the disk;

writing the second segment of the reference band during a second revolution of the disk; and measuring the third timing offset during the second revolution of the disk.

18. The method as recited in claim 16, further comprising:

writing a fourth plurality of reference bursts along a fifth radius of the disk circumferentially offset from the first, second and fourth radius, the fourth plurality of reference bursts comprising a fourth reference burst;

measuring a fourth timing offset between the third reference burst and the fourth reference burst; and writing a third segment of the reference band radially coherent with the second segment based on the fourth timing offset.

19. The method as recited in claim 18, further comprising:

writing the first segment of the reference band during a first revolution of the disk;

writing the second segment of the reference band during a second revolution of the disk;

measuring the fourth timing offset during the second revolution of the disk; and writing the third segment of the reference band during a third revolution of the disk.

20. The method as recited in claim 18, further comprising measuring the second offset by measuring an interval as the disk rotates.

* * * * *